(12) United States Patent
Kuemmerling et al.

(10) Patent No.: US 11,493,101 B2
(45) Date of Patent: Nov. 8, 2022

(54) BRAKE DUST PARTICLE FILTER, LIGHTING HOUSING PART FOR A BRAKE DUST PARTICLE FILTER, AND VEHICLE WITH BRAKE DUST PARTICLE FILTER

(71) Applicant: MANN+HUMMEL GmbH, Ludwigsburg (DE)

(72) Inventors: Volker Kuemmerling, Bietigheim-Bissingen (DE); Thomas Jessberger, Asperg (DE); Lukas Bock, Bietigheim-Bissingen (DE); Ferdinand Pflugfelder, Markgroeningen (DE); Gunnar Blanck, Stuttgart (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 17/100,441

(22) Filed: Nov. 20, 2020

(65) Prior Publication Data
US 2021/0140498 A1    May 13, 2021

Related U.S. Application Data

(63) Continuation of application No. PCT/EP2019/062209, filed on May 13, 2019.

(30) Foreign Application Priority Data

May 22, 2018  (DE) .......................... 102018112259.4
Sep. 13, 2018  (DE) .......................... 102018122346.3

(51) Int. Cl.
*F16D 65/00* (2006.01)
*B60Q 1/26* (2006.01)
(Continued)

(52) U.S. Cl.
CPC ....... *F16D 65/0031* (2013.01); *B60Q 1/2661* (2013.01); *F16D 55/22* (2013.01);
(Continued)

(58) Field of Classification Search
CPC ......... F16D 65/0031; F16D 2055/0037; F16D 55/22; F21W 2104/00; B60Q 1/326;
(Continued)

(56) References Cited

U.S. PATENT DOCUMENTS 5,573,686 A    11/1996  Lavicska
6,322,237 B1 *  11/2001  Lee ........................ B60Q 1/326
                                                            362/234
(Continued)

FOREIGN PATENT DOCUMENTS

DE    202005009278 U1    5/2006
DE    202010011328 U1 *  10/2010    ............. B60Q 1/326
(Continued)

*Primary Examiner* — Erin Kryukova

(57) ABSTRACT

A brake dust particle filter for a disc brake assembly of a vehicle has at least one housing structure engaging across a brake disc and/or a brake caliper of the disc brake assembly at least in sections in a mounted state of the brake dust particle filter at the disc brake assembly. The brake dust particle filter is designed to catch particles generated during braking. At least one light source, especially an LED light source, is provided at the brake dust particle filter. A lighting housing part is provided that is to be attached to the housing structure. A vehicle is provided with such a brake dust particle filter provided with a light source.

12 Claims, 3 Drawing Sheets

(51) Int. Cl.
*F16D 55/22* (2006.01)
*F21V 15/01* (2006.01)
*F21Y 115/10* (2016.01)
*F21W 104/00* (2018.01)

(52) U.S. Cl.
CPC .......... *F21V 15/01* (2013.01); *F21W 2104/00* (2018.01); *F21Y 2115/10* (2016.08)

(58) Field of Classification Search
CPC ...... B60Q 1/44; B60Q 1/2661; B60Q 1/0088; F21V 15/01; F21Y 2115/10
See application file for complete search history.

(56) References Cited

U.S. PATENT DOCUMENTS

| | | | | |
|---|---|---|---|---|
| 7,144,142 B1 * | 12/2006 | Suarez | ............... | B60Q 1/326 |
| | | | | 362/500 |
| 7,160,009 B1 * | 1/2007 | Martin | ............... | B60Q 1/326 |
| | | | | 362/500 |
| 9,236,761 B2 | 1/2016 | Strothmann | | |
| 2002/0139453 A1 | 10/2002 | Krishnan | | |
| 2003/0053317 A1 | 3/2003 | Mertens | | |
| 2003/0151924 A1 * | 8/2003 | Gloodt | ............... | B60Q 1/326 |
| | | | | 362/500 |
| 2004/0042227 A1 * | 3/2004 | Gloodt | ............... | B60Q 1/326 |
| | | | | 362/500 |
| 2004/0125612 A1 | 7/2004 | Jackson | | |
| 2005/0258008 A1 * | 11/2005 | King | ............... | F16D 65/00 |
| | | | | 188/264 R |
| 2006/0268562 A1 * | 11/2006 | Smith, II | ............... | B60Q 1/326 |
| | | | | 362/500 |
| 2008/0029357 A1 | 2/2008 | Krantz | | |
| 2009/0141514 A1 * | 6/2009 | Palkovic | ............... | B60Q 1/326 |
| | | | | 362/509 |
| 2010/0065387 A1 * | 3/2010 | Tsiberidis | ............ | F16D 65/0031 |
| | | | | 188/218 A |
| 2010/0163350 A1 | 7/2010 | Bach et al. | | |
| 2012/0067206 A1 * | 3/2012 | Lupica | ................ | F16D 65/092 |
| | | | | 188/73.1 |
| 2014/0054119 A1 | 2/2014 | Hummel et al. | | |
| 2014/0054121 A1 | 2/2014 | Hummel et al. | | |
| 2018/0031059 A1 | 2/2018 | Gelb | | |

FOREIGN PATENT DOCUMENTS

| | | | | |
|---|---|---|---|---|
| DE | 102014017981 A1 * | 6/2015 | ............. | B60Q 3/20 |
| DE | 102016104006 A1 | 9/2017 | | |
| EP | 1837066 A2 | 9/2007 | | |
| EP | 2597329 A1 | 5/2013 | | |
| GB | 689017 A | 3/1953 | | |
| JP | 2004284564 A | 10/2004 | | |
| KR | 20120060463 A * | 6/2012 | ......... | F16D 65/0031 |
| WO | 2016127524 A1 | 8/2016 | | |

* cited by examiner

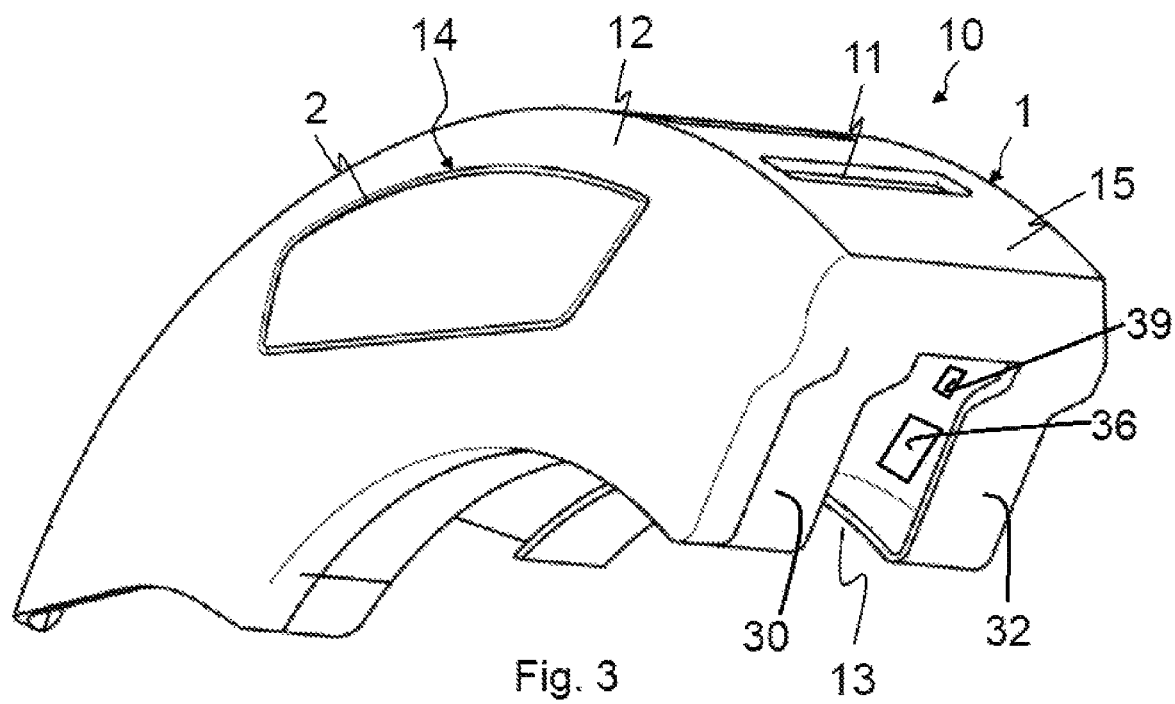
Fig. 3
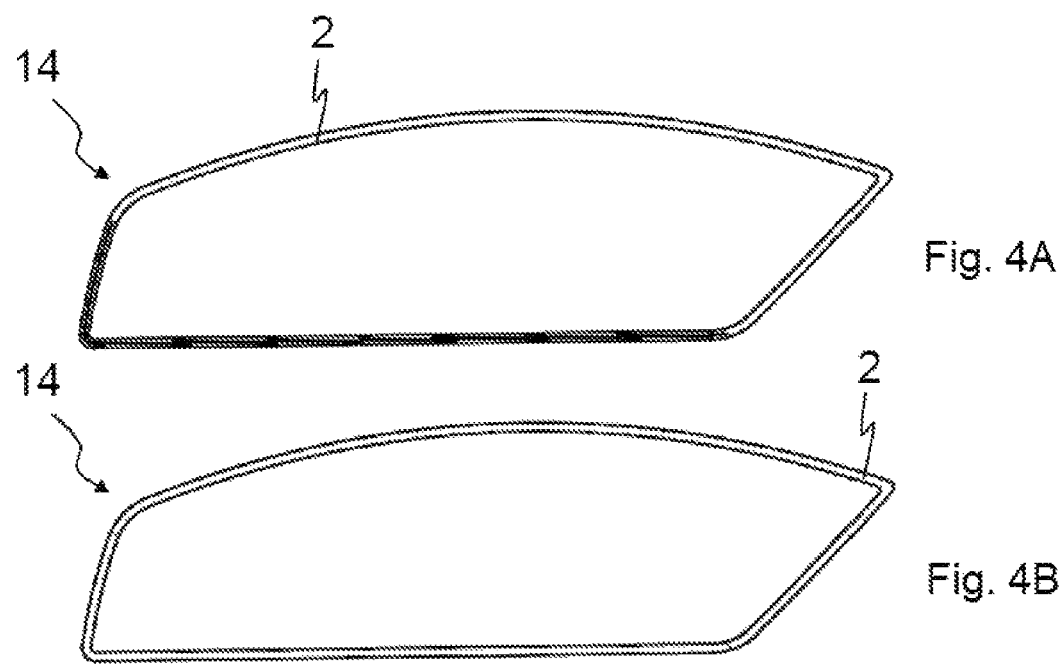
Fig. 4A
Fig. 4B

BRAKE DUST PARTICLE FILTER, LIGHTING HOUSING PART FOR A BRAKE DUST PARTICLE FILTER, AND VEHICLE WITH BRAKE DUST PARTICLE FILTER

CROSS-REFERENCE TO RELATED APPLICATIONS

This application is a continuation application of international application No. PCT/EP2019/062209 having an international filing date of 13 May 2019 and designating the United States, the international application claiming a priority date of 22 May 2018 based on prior filed German patent application No. 10 2018 112 259.4 and claiming a priority date of 13 Sep. 2018 based on prior filed German patent application No. 10 2018 122 346.3, the entire contents of the aforesaid international application and the two aforesaid German patent applications being incorporated herein by reference.

BACKGROUND OF THE INVENTION

The invention concerns a brake dust particle filter for a vehicle, a lighting housing part for the brake dust particle filter as well as the vehicle itself.

It is known to catch particles that are produced by brake abrasion with brake dust particle filters and to dispose of them. Such particles are produced by friction between brake pad and brake disc of a disc brake and present a significant health hazard due to their particle size as well as the substances contained therein.

Brake dust particle filters are known in the prior art in various configurations. In addition to attempts to completely encapsulate the brake devices, vacuuming solutions are known which have however the disadvantage that they can be retrofitted only with difficulty. On the other hand, brake dust filters are known which have a housing structure that encloses the brake disc at least in sections in a U shape and adjoins the brake caliper in direction of rotation of the brake disc. Such a brake dust particle filter is disclosed, for example, in U.S. Pat. No. 8,025,132 B2.

However, the brake dust particle filter described therein soils quickly and is therefore not perceived as a styling element on a vehicle; instead, it is more likely that it is viewed by the average observer as a part of the brake device.

SUMMARY OF THE INVENTION

Based on this prior art, it is an object of the invention to provide a brake dust particle filter that provides a good cleaning performance and in addition also serves as an attractive eye-catcher on the vehicle, during the day as well as at night, and is therefore capable of providing an additional benefit to an environmentally effective filtration solution for vehicles.

This object is solved by a brake dust particle filter for a disc brake assembly of a vehicle, in particular of a motor vehicle, in particular of a road or rail vehicle, wherein the disc brake assembly comprises a brake disc and a brake caliper and the brake dust particle filter is configured for catching particles that are generated during braking, and wherein the brake dust particle filter comprises at least one housing structure by means of which the brake disc and/or the brake caliper can be engaged across in a mounted state at least in sections, wherein that the brake dust particle filter comprises at least one light source.

The brake dust particle filter according to the invention is provided for a disc brake assembly of a vehicle, in particular of a motor vehicle, in particular of a road or rail vehicle, wherein the disc brake assembly comprises a brake disc and a brake caliper. The brake dust particle filter is designed for catching particles that are produced during braking and has at least one housing structure that is configured to engage, at least in sections, around the brake disc and/or the brake caliper in a mounted state. The brake dust particle filter comprises at least one light source.

The housing structure can be comprised in particular of metal, in particular of sheet steel, in order to be able to withstand the temperatures in the environment of the brake device. It can be embodied in a two-part configuration for servicing purposes, for example, of two deep-drawn half shells.

Light source is to be understood primarily as a light source for illuminating the brake dust particle filter or at least parts of the brake dust particle filter so that the light source must have a certain lighting intensity and, for example, would be discernable from status LEDs. By means of the lighting of the brake dust particle filter provided according to the invention, it is possible to attractively highlight a clean technology and also make it visible for technical laypersons: this is in particular working well when wheel rims with large cutouts are used in a mounted state on a vehicle which permit a view of the parts of the brake device. For example, by use of the brake dust particle filter according to the invention, an inexpensive brake device as it is frequently used in compact vehicles and mid-sized vehicles can be visually enhanced and made to resemble high-performance brake devices as they are known from high-end vehicles and sports cars. Of course, the brake dust particle filter according to the invention is suitable also for high-performance brake devices with multi-piston brake calipers and/or ceramic composite brake discs that can be enhanced even more by use of a high quality filter system.

In an interior of the housing structure of the brake dust particle filter, at least one filter medium is arranged which is preferably a high temperature-stable metal nonwoven, for example, of stainless steel. In this context, the metal nonwoven can line the interior at least at an inner circumferential wall surface of the housing structure, preferably additionally at the inner end face surface (relative to an axis of rotation of the brake disc in the mounted state).

The light source of the brake dust particle filter can be controlled in particular such that it emits light in a discontinuous or flashing or pulsating way; this is no problem with electrical light sources.

According to a first embodiment, the light source can be an electrical light source, in particular an LED light source, and/or a chemoluminescent, phosphorescent, or fluorescent light source. Aside from the LED light source, of course further lighting means are possible, for example, conventional incandescent lamps, gas discharge lamps. Phosphorescent and/or fluorescent light sources have, on the one hand, the disadvantage that they cannot be activated at random but react to prior light exposure; on the other hand, such a lighting can be implemented very easily because no energy supply is required and they can be applied merely as a coating on a housing structure of the brake dust particle filter which is very cost-efficient.

In a further embodiment, the housing structure of the brake dust particle filter can be designed such that it extends across a predetermined circumferential angle of the brake disc and preferably can be mounted adjoining the brake caliper in circumferential direction in the mounted state which contributes to being able to filter a portion as large as possible of the brake dust generated by frictional contact within the brake caliper.

Alternatively or additionally, the housing structure of the brake dust particle filter can comprise a surface coating, in particular a colored surface coating, in particular a coat of lacquer or powder coating, whereby an adaptation to the appearance of the adjoining brake caliper is possible.

In yet a further embodiment, it can be provided that the at least one light source is arranged at the housing structure, in particular at an exterior side which is facing away from the brake disc in the mounted state, in particular at an end face, viewed in an axial direction of the brake disc, and/or circumferential wall surface of the housing structure. By means of an arrangement of the light source at the exterior side of the housing structure, a particularly good visibility of the lighting of the brake dust particle filter in the mounted position can be achieved.

Alternatively or in addition, the at least one light source can also be provided at an inner side of the housing structure which is facing the brake disc in the mounted state so that the brake dust particle filter can be illuminated from the interior.

The at least one light source can be a spot light source, an areal light source and/or a line-shaped light source. The properties of these types of light sources are known in principle to a person of skill in the art. These light sources can be used at the brake dust particle filter according to the invention individually or in combination wherein by means of each kind of light source a different visual effect can be achieved.

For example, it can be provided that at least one light source is embodied in the form of an accentuating lighting, in particular as a circumferential lighting of a geometric element, a logo, a logotype. Such shapes can be realized, for example, by LED light strips or LED bands that can be cut to size. The accentuating lighting makes it possible to individualize the brake dust particle filter in that the shape of the illuminated accentuation is matched to a company logo and/or logotype, for example, of a vehicle manufacturer.

According to a further embodiment, it is provided that the housing structure comprises at least one housing aperture that is configured to make visible from the exterior a light source that is arranged at an inner side of the housing structure facing the brake disc in the mounted state. For example, this housing aperture can also comprise, as already described, an individualized geometric shape or a company logo and can be produced, for example, by laser machining, waterjet cutting, electrical discharge machining or punching.

According to a preferred embodiment, the areal light source can be applied in the form of an illuminable foil, in particular an LED foil, to the housing structure or can be present as a lacquered LED or printed LED.

LED foils are available in pre-sized configuration, can be cut to size, in order to then be glued onto the component. Alternative fastening types of such LED foils are, for example, clips, rivets and the like. The LED foil itself has a connecting cable that is connectable to an electrical light source. As a variant, the LED foils can be produced by means of a screen printing method wherein in general the back side as well as the front side contacts as well as protective layers are printed onto a foil carrier; this is very efficient and cost-beneficial.

As an alternative to this, it is possible to apply an LED directly by means of a lacquering method to the housing structure of the brake dust particle filter. In this context, in principle the same approach as in the manufacture of a printed LED is used: By lacquering, anode as well as cathode are directly lacquered onto the component, in addition also a protective lacquer can be applied which protects the layers participating in current conduction from mechanical damage and keeps away moisture.

According to yet another embodiment, it can be provided that the brake dust particle filter comprises at least one element of an inductive voltage producing device which in the mounted state, in particular in interaction with an inductive counter element that is mountable at the brake disc and/or at a wheel rim coupled fixedly to the brake disc, provides a voltage supply of the at least one light source. The element of an inductive voltage generating device arranged at the brake disc particle filter can be, for example, a coil while the inductive counter element that is entrained in motion in the mounted state is a magnet, or vice versa. Such an inductive voltage supply of the light source has the advantage that no cables must be laid and that the transmission functions contactless, which is important in particular in the region of wheel hub regions of a vehicle that are prone to become soiled.

Alternatively or additionally, the energy supply can be realized by means of at least one thermoelectric generator which comprises a voltage output that is electrically connected to the at least one light source, wherein the thermoelectric energy converter is arranged preferably at an inner side of the housing structure facing the brake disc in the mounted state. For the temperatures usually occurring in the region of a vehicle brake, it is to be expected that the thermoelectric generator can provide a sufficient energy quantity for operating an LED light source.

Alternatively or additionally, the energy supply can be realized by means of a vehicle electrical system for which purpose the at least one light source is connected to an electrical connector element, in particular, a cable, plug, socket, that is connectable in the mounted state to a corresponding counter element to which the vehicle voltage is applied.

Finally, the brake dust particle filter can comprise for supply of energy an electrical energy store, in particular a battery or a rechargeable battery that is electrically connected to the at least one light source; this is well suited in particular for retrofitting. The electrical energy store can be embodied of a compact design due to the comparatively minimal current consumption of LED light sources, for example, as a button cell or flat rechargeable battery.

Moreover, the at least one light source can be a color-adjustable light source, in particular a color-adjustable LED, for example, an RGB LED whose color can be adjusted by a suitable controller.

In a particularly preferred embodiment, the brake dust particle filter can comprise at least one sensor 39 which is connected to a data processor that evaluates the sensor signal and controls operation of the at least one light source according to predetermined criteria. Preferably, the sensor 39 is configured to detect loading of the filter medium arranged in the housing structure wherein a color adaptation of the color-adjustable light source can be performed in particular as a function of the loading state of the filter medium.

In addition to the load sensors mentioned herein as an example which, for example, can be a pressure sensor or optical sensor, the brake dust particle filter according to the invention can be provided alternatively or additionally with sensors of other types. For example, a light sensor can be provided by means of which the light source can be switched on when a predetermined brightness is undershot, a position determination sensor, by means of which the light source can be switched on at predetermined locations and/or when surpassing or dropping below certain travel speeds.

The embodiment with load sensor has the advantage that a load state of the brake dust particle filter can be optically indicated, visible from the exterior. For example, for a loaded and an unloaded filter, different lighting colors can be provided (e.g., full filter red, unloaded filter green) or the lighting is switched on exclusively when the filter is loaded so that a service indicator can also be realized by a combination of a colored housing structure with a lighting of a different color.

Such a service indicator, since it is visible from the exterior, has the advantage that it can be detected, for example, by traffic monitoring cameras so that, by creating a corresponding legal framework, mandatory use of brake dust particle filters can be easily and efficiently monitored.

According to an also preferred embodiment, it is provided that the at least one light source is present at a lighting housing part that is separate from the housing structure and that is exchangeably connected to the housing structure, for example, by means of at least one quick-connect device (e.g., clip connection and/or magnetic connection). This provides the advantage that the brake dust particle filter can be individualized even more simply and inexpensively because with the same housing structure a plurality of variants can be covered because only an individual lighting housing part is required for a lighting adaptation.

The housing structure can moreover comprise at least one recess which corresponds to the shape and the dimensions of the lighting housing part and in which the lighting housing part is accommodated so that the lighting housing part fits seamlessly within the appearance of the housing structure, preferably without projecting edges or gaps.

The afore described lighting housing part itself is a further aspect of the present invention. In a preferred embodiment, the light source can be an electrical light source and the lighting housing part comprises an electrical energy store which is electrically connected or connectable to the light source. This embodiment, in turn, enables a particularly simple retrofitting of a lighting solution wherein a person of skill in the art knows batteries or rechargeable batteries which are of a corresponding flat configuration. Alternatively, the lighting housing part can comprise an electrical contact element that is connectable to a corresponding electrical contact counter element at the housing structure of the brake dust particle filter.

A final aspect of the invention concerns a vehicle, in particular motor vehicle, in particular rail or road vehicle, that comprises a disc brake device and an illuminated brake dust particle filter according to the invention. In addition to passenger cars, the filter can be mounted on trucks, buses, tractors, construction machines, motorcycles, bicycles, i.e., at arbitrary vehicles. A wide range of uses is possible also in case of rail vehicles wherein the range ranges from trolley cars to locomotives all the way to (rail) car brakes.

According to a further embodiment of the vehicle according to the invention, the at least one light source of the brake dust particle filter can be controllable as a function of a vehicle status parameter, in particular as a function of a braking event, travel direction change and/or speed value. Advantageously, the at least one light source can be activatable upon switching on a turn signal, brake actuating switch, and/or driving or parking light.

In practice, this can be realized particularly advantageously by an electrical light source which, by measures known generally to a person of skill in the art (electrical circuitry, control by ECU etc.), can be controlled in the manner according to the invention.

By being arranged closely above the road surface behind the wheel rims, the lighting of the brake dust particle filter is visible particularly well for traffic participants with a low seat height, for example, children, wheelchair riders, bicyclists etc., and makes it possible therefore to increase the traffic safety for these groups. In particular, when the lighting of the brake dust particle filter is coupled with a turn signal of the vehicle, this can increase significantly the safety when turning. The same holds true for braking processes which become also better recognizable, wherein the at least one light source in this context can be controlled also in particular to emit red light, in particular an intermittent or pulsating red light.

BRIEF DESCRIPTION OF THE DRAWINGS

Further advantages result from the following drawing description. In the drawings, embodiments of the invention are illustrated. The drawings, description, and claims contain numerous features in combination. A person of skill in the art will consider the features expediently also individually and combine them to other expedient combinations.

FIG. 3 shows an isometric view of a further embodiment of the brake dust particle filter according to the invention.

FIG. 4 shows plan views of two separate lighting housing parts for accentuating lighting of the brake dust particle filter of FIG. 3.

DESCRIPTION OF PREFERRED EMBODIMENTS

Figure 1:
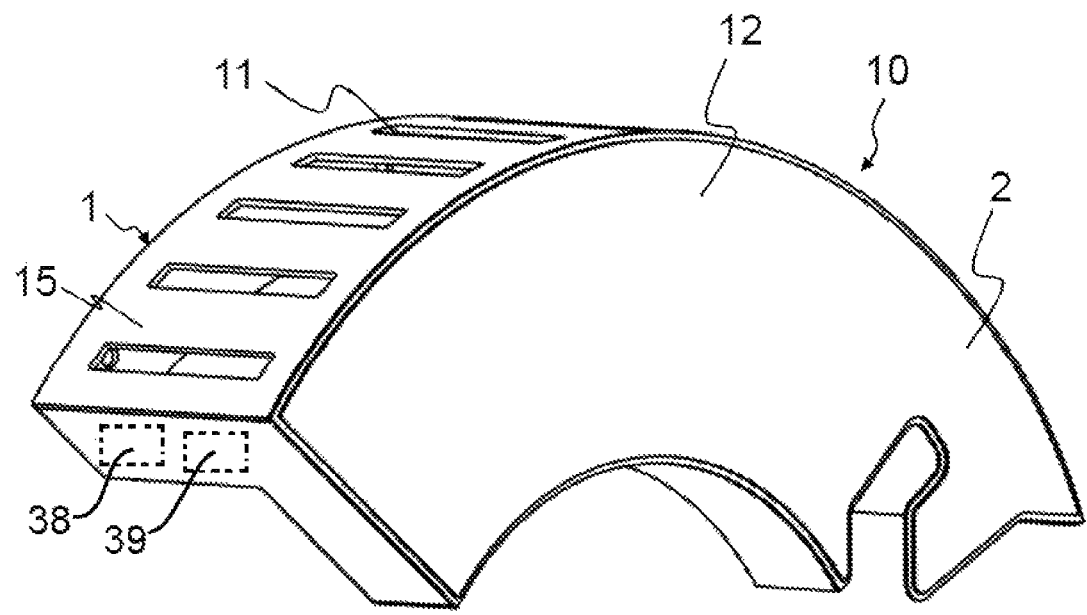
FIG. 1 shows an isometric view of a first embodiment of the brake dust particle filter according to the invention.

In the Figures, same or same-type components are identified with same reference characters. The Figures show only examples and are not to be understood as limiting.

In FIG. 1, the brake dust particle filter 10 according to the invention is shown in a first embodiment. It comprises a housing structure 1 which has a circumferentially curved shape and can be mounted in a disc brake system radially between the wheel hub and an inner wheel rim edge. In circumferential direction, the brake dust particle filter 10 is suitably mounted adjoining the brake caliper 5 so that gap losses as little as possible are generated. The housing structure 1 comprises at its circumferential wall surface 15 a plurality of axially extending slots 11 that serve for air discharge and thus for ensuring cooling of the components of the brake system. In the interior of the housing structure 1, a filter medium is arranged that, for example, covers the interior at the inner end face and/or inner circumferential wall surfaces. At an outer end face surface 12, an areal light source 2 in the form of an illuminable LED foil is applied. The LED foil can be selectively supplied with current by voltage supply systems correlated with the brake dust particle filter 10 such as rechargeable battery 38, or can be connected by means of an electrical connecting cable to an onboard electrical system, which, since known from joining ABS sensors, is technically easily realized. Of course, the lighting must not be realized across the entire surface but can also comprise only partial regions of the outer end face surface 12. Alternatively or additionally, the outer circumferential wall surface 15 can be at least partially illuminated in that at least one light source 2 is provided thereat.

Figure 2:
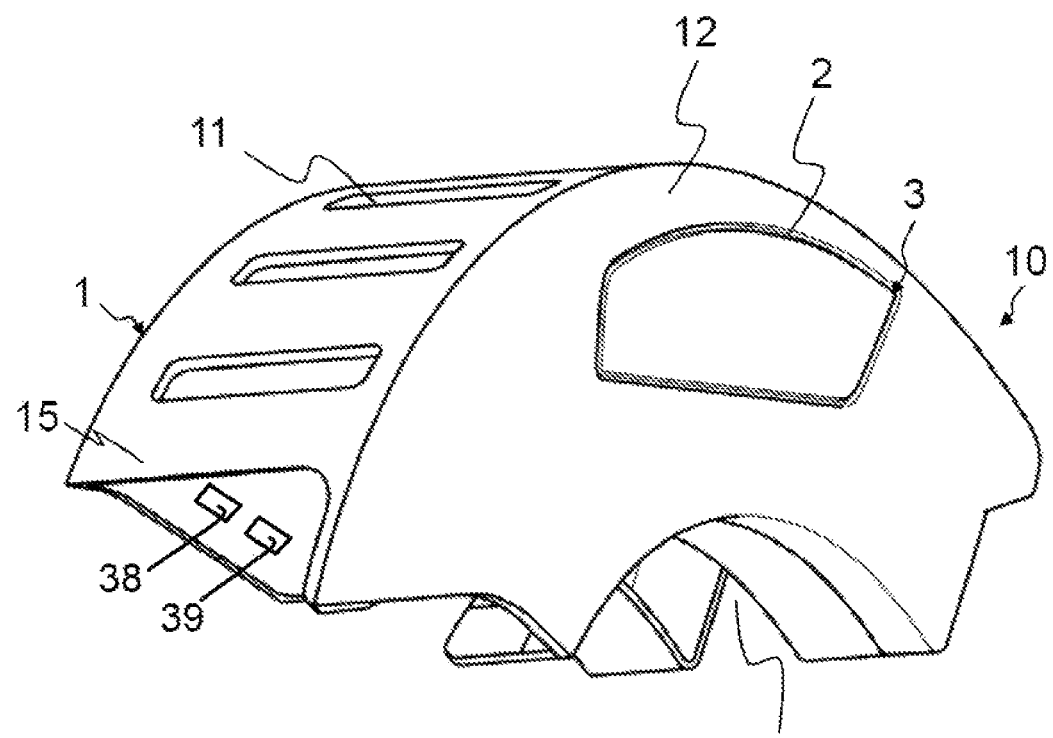
FIG. 2 shows an isometric view of a further embodiment of the brake dust particle filter according to the invention.

In the embodiment of FIG. 2 only one accentuating lighting 3 is illustrated according to which the outer circumferential wall surface 12 is not completely illuminated but exclusively in the region of the accentuation 3. Otherwise, the brake dust particle filter illustrated in FIG. 2 corresponds to that in FIG. 1. The accentuating lighting 3 comprises an LED light strip 2 surrounding the contour of the accentuation which is suitably accommodated in a corresponding receiving groove in the surface of the housing structure 1 and, as needed, can also be embedded therein by potting. The illustrated shape of the accentuating lighting 3 is only an example and can comprise, as needed, any arbitrary shapes, i.e., polygonal, elliptical, circular, complex/combined shapes. As desired, only a part of the circumference of the accentuation can be illuminated, for example, its lower or upper half. In this view, moreover an axial gap 13 can be seen that is present between two halves of the housing structure 1 and serves for receiving the brake disc in the mounted state (see FIG. 5).

In FIGS. 3, 4A and 4B, an embodiment is illustrated according to which the accentuation lighting 3 is realized in the form of a separate lighting housing part or lighting plate 14 which in turn is detachably connected to the housing structure, specifically the first axially outer wall 30 of the brake dust particle filter housing 1, or also referred to herein as the housing structure. The lighting housing part or lighting plate 14 is for example, clipped on or joined by a magnetic element. The lighting housing part 14 in the simplest case is a lighting plate 14 whose curvature is matched to a curvature which is possibly present at the end face surface 12 of the first axially outer wall 30 of the brake dust particle filter housing 1, also referred to herein as of the housing structure 1. For a seamless joining of the lighting housing part 14, moreover a recess corresponding to the lighting housing part 14 can be provided at the end face surface 12 of the housing structure 1. As best seen in FIG. 3, the brake dust particle filter housing 1 has an outer circumferential wall 15 configured to extend axially across an outer circumference of a brake disc 4 (see FIG. 5), when in the mounted state. The brake dust particle filter housing 1 has a first axially outer wall 30 arranged at a first axially outer side of the brake disc 4, The first axially outer wall 30 is connected to and extending radially inwardly from the outer circumferential wall 15 to at least partially cover the first axially outer side of the brake disc 4. The brake dust particle filter housing 1 further has a second axially outer wall 32 arranged at an opposite second axially outer side of the brake disc 4, the second axially outer wall 32 is connected to and extending radially inwardly from the outer circumferential wall 15 to at least partially cover the opposite second axially outer side of the brake disc 4. Spacing between the first axially outer wall 30 and the second axially outer wall 32 of the brake dust particle filter housing 1) forms an axial gap 13 into which a portion of the brake disc 4 is received, when in the mounted state. The outer circumferential wall 15 of the brake dust particle filter housing 1 includes a plurality of outflow openings 11 or slots providing air cooling of the brake disc 4 during vehicle braking. The thermoelectric energy converter 36 is schematically shown connected to and in the interior of the brake dust particle filter housing 1.

In FIGS. 4A and 4B two lighting housing parts or lighting plates 14 per se are illustrated which also represent an independent aspect of the invention. In FIG. 4A, the lighting housing part 14 according to the invention is illuminated only in an upper circumferential region (i.e. outer circumferential top and right side as shown) while in FIG. 4B the lighting housing part 14 is illuminable along its entire outer circumference, as shown.

Figure 5:
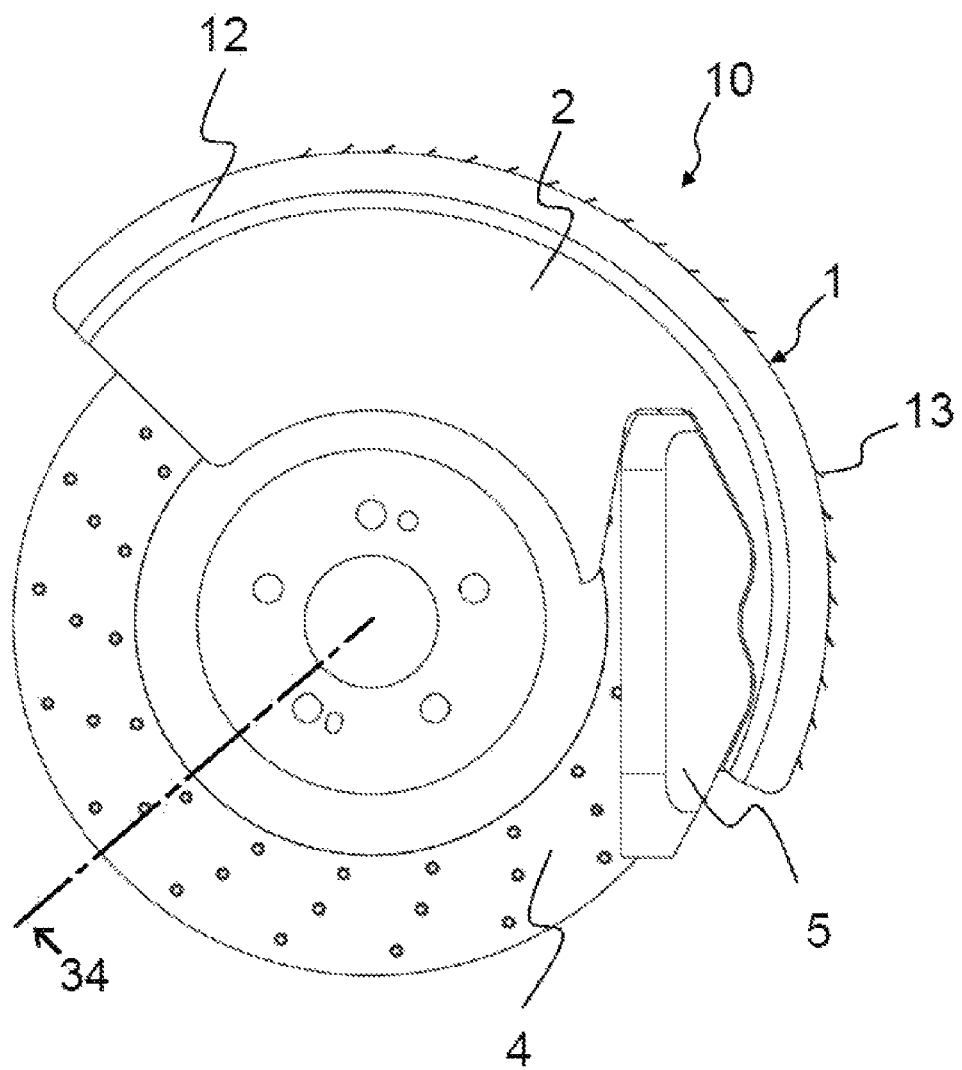
FIG. 5 shows a plan view of a further embodiment of the brake dust particle filter in a mounted state.

In FIG. 5, finally the brake dust particle filter 10 is shown in its mounted state in a disc brake system that comprises a brake disc 4 and a brake caliper 5 adjoined directly by the housing structure 1 that additionally engages across the brake caliper 5 radially outwardly. As shown in FIG. 5 the brake disc 4 rotates about an axis of rotation 34. The housing structure 1, also referred to herein as the brake dust particle filter housing 1, has at its circumferential wall surface a plurality of tabs 13 which are present adjacent to the outflow openings 11 (see FIGS. 1 to 3) and which are to affect the airflow. The brake dust particle filter 10 according to this embodiment is also illuminated, namely at its end face surface 12 to which an LED foil is applied at least in sections.

What is claimed is:

1. A brake dust particle filter for a disc brake assembly of a vehicle, wherein the disc brake assembly comprises a brake disc and a brake caliper, the brake dust particle filter comprising:
   a housing structure of the brake dust particle filter engaging across the brake disc and/or the brake caliper at least partially in a mounted state of the brake dust particle filter at the disc brake assembly,
      wherein the brake dust particle filter is configured to catch particles generated during braking;
   at least one light source; the brake dust particle filter further comprising
   at least one thermoelectric energy converter comprising a voltage output electrically connected to the at least one light source,
   wherein the thermoelectric energy converter is arranged at an inner side of the at least one housing structure facing the brake disc in the mounted state.

2. The brake dust particle filter according to claim 1, further comprising
   at least one sensor connected to a data processor configured to evaluate a sensor signal and to control, based on the sensor signal, an operation of the at least one light source according to predetermined criteria.

3. A brake dust particle filter for a disc brake assembly of a vehicle, wherein the disc brake assembly comprises a brake disc and a brake caliper, the brake dust particle filter comprising:
   a housing structure of the brake dust particle filter engaging across the brake disc and/or the brake caliper at least partially in a mounted state of the brake dust particle filter at the disc brake assembly,
      wherein the brake dust particle filter is configured to catch particles generated during braking;
   at least one light source; the brake dust particle filter further comprising
   at least one sensor connected to a data processor configured to evaluate a sensor signal and to control, based on the sensor signal, an operation of the at least one light source according to predetermined criteria;
   wherein the sensor is a sensor configured to detect loading of a filter medium arranged in the at least one housing structure,
   wherein the data processor is configured to perform a color adaptation of the at least one light source that is color-adjustable as a function of a load state of the filter medium.

4. A brake dust particle filter for a disc brake assembly of a vehicle, wherein the disc brake assembly comprises a brake disc and a brake caliper, the brake dust particle filter comprising:
- a housing structure of the brake dust particle filter engaging across the brake disc and/or the brake caliper at least partially in a mounted state of the brake dust particle filter at the disc brake assembly,
  - wherein the brake dust particle filter is configured to catch particles generated during braking;
- at least one light source;
- a lighting housing part configured to be connected exchangeably to the brake dust particle filter,
- wherein the at least one light source is provided on the lighting housing part;
- wherein the at least one light source is an electrical light source,
- wherein the lighting housing part further comprises
- an energy store capable of being electrically connected to the at least one light source.

5. The brake dust particle filter according to claim 4, wherein
the brake dust particle filter housing structure extends about a predetermined circumferential angle of the brake disc and is configured to adjoin in the mounted state the brake caliper in a circumferential direction of the brake disc.

6. The brake dust particle filter according to claim 4, wherein
the brake dust particle filter housing structure comprises a surface coating.

7. The brake dust particle filter according to claim 6, wherein
the surface coating is a colored surface coating selected from the group consisting of a coat of lacquer and a powder coating.

8. The brake dust particle filter according to claim 4, wherein
the at least one light source is arranged on a first axially outer wall of the brake dust particle filter housing structure at an exterior side facing away from the brake disc in the mounted state of the brake dust particle filter.

9. The brake dust particle filter according to claim 4, wherein
the at least one light source is color-adjustable.

10. The brake dust particle filter according to claim 4, wherein
the at least one light source is a lighting plate that is separable from and is capable of being connected exchangeably on a first axially outer wall of the brake dust particle filter housing structure.

11. The vehicle according to claim 4, wherein
the at least one light source of the brake dust particle filter is configured to be controlled as a function of a vehicle condition parameter.

12. The vehicle according to claim 11, wherein
the vehicle control parameter is
- a braking process,
- a directional change and/or
- a speed value, and wherein the at least one light source is configured to be activated upon switching on at least one of
- a turn signal,
- a brake actuating switch,
- a driving light, and
- a parking light of the vehicle.

* * * * *